United States Patent [19]

Schmeller

[11] Patent Number: 4,826,128
[45] Date of Patent: May 2, 1989

[54] LIFTING PLATFORM GUIDING SYSTEM, PARTICULARLY FOR DYNAMICALLY LOADED PLATFORMS

[75] Inventor: Michael Schmeller, Pfronten-Meilingen, Fed. Rep. of Germany

[73] Assignee: Visita MTC Ltd., Chur, Switzerland

[21] Appl. No.: 101,826

[22] Filed: Sep. 28, 1987

[30] Foreign Application Priority Data

Oct. 21, 1986 [DE] Fed. Rep. of Germany ....... 3635700

[51] Int. Cl.$^4$ ............................................. F16M 11/18
[52] U.S. Cl. ..................... 248/669; 248/638; 248/581; 384/54; 384/55; 384/58
[58] Field of Search ............... 248/638, 669, 157, 581; 108/144, 147; 384/50, 55, 54, 57, 58, 59, 10

[56] References Cited

U.S. PATENT DOCUMENTS

| | | | |
|---|---|---|---|
| 2,525,712 | 10/1950 | Neighbour | 384/55 |
| 3,407,011 | 10/1968 | Zeidler | 384/54 |
| 4,157,851 | 6/1979 | Tomuro | 108/47 X |
| 4,375,195 | 3/1983 | Tsuboi | 384/58 X |
| 4,515,415 | 5/1985 | Szenger | 384/50 X |
| 4,601,521 | 7/1986 | Foulke | 384/54 |
| 4,623,201 | 11/1986 | Gallone | 384/55 X |

FOREIGN PATENT DOCUMENTS

| | | | |
|---|---|---|---|
| 257089 | 9/1967 | Austria | 108/144 |
| 636315 | 2/1962 | Canada | 384/50 |
| 1554271 | 5/1969 | Fed. Rep. of Germany | 108/147 |
| 2818016 | 11/1979 | Fed. Rep. of Germany | 108/144 |
| 3151986 | 7/1983 | Fed. Rep. of Germany | 248/669 |
| 990142 | 9/1951 | France | 384/54 |

Primary Examiner—Ramon S. Britts
Assistant Examiner—Karen J. Chotkowski
Attorney, Agent, or Firm—Frishauf, Holtz, Goodman & Woodward

[57] ABSTRACT

To support machinery subject to dynamic vibration in operation, such as sewing machines and the like, on a platform which is movable longitudinally with respect to a post (12), a carriage (14) has at least three or four rollers located thereon of essentially double-conical shape, engaging circular guide surfaces (24) formed on the post. The post (12) preferably is a hollow extruded aluminum rail (12), and the conical portions (46) of the roller form lateral portions having, in cross section, a concave contour which overlaps a projected contour of the guide surfaces of the rails adjacent the terminal ends. The rollers are of elastically deformable material so that, upon engagement with the rail, the terminal end portions will compress and place the guide surfaces under compressive force which is accepted by the rollers, acting in the direction parallel to the shaft axis of the rollers. The center portion of the rail (12) between the guide surfaces (24) where engaged by the roller (42) is relieved (28) so that the central portion (44) of the roller does not contact the post, to permit the compressive force to be fully effective.

13 Claims, 2 Drawing Sheets

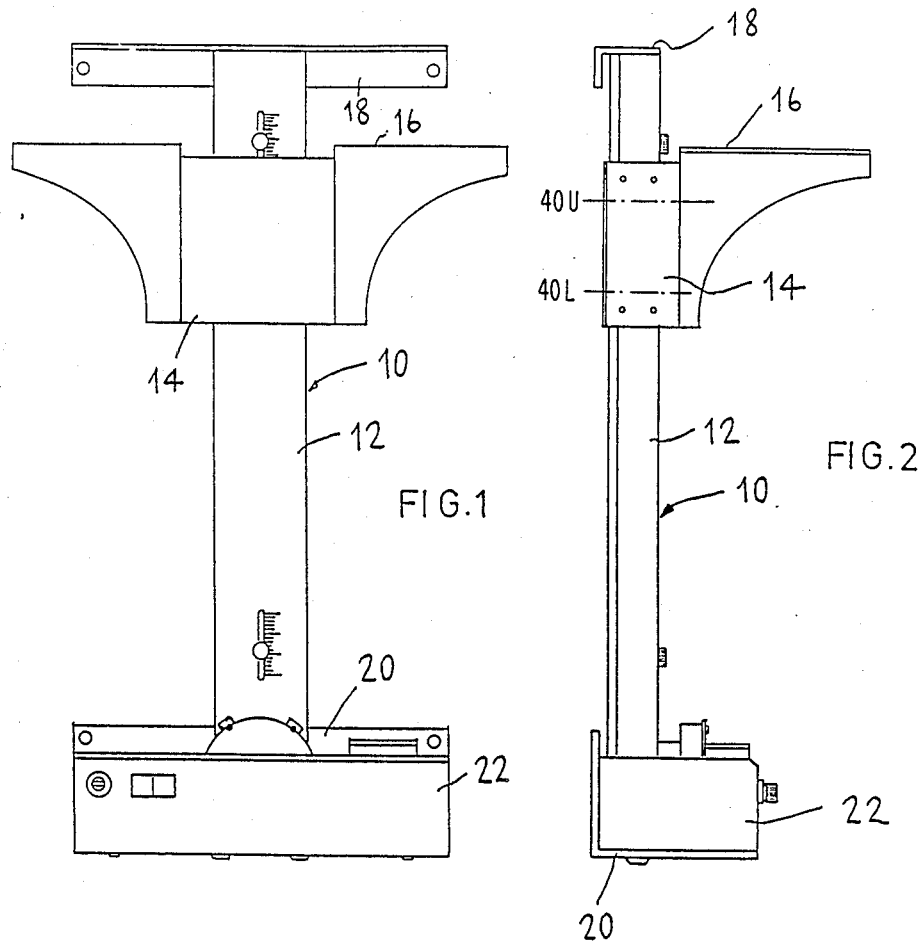

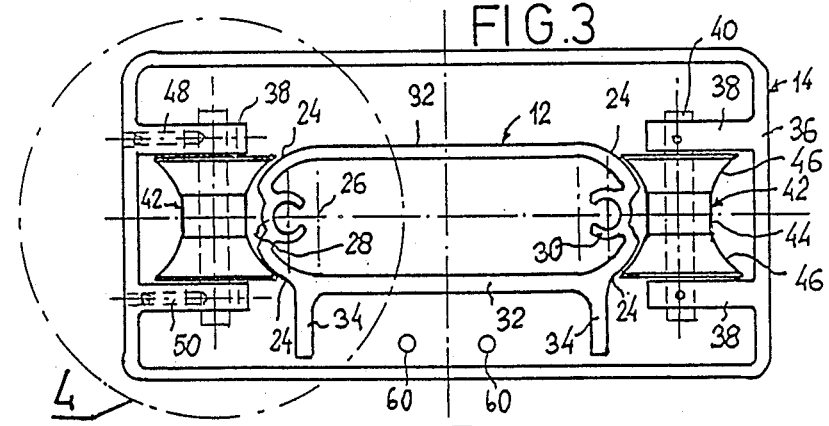
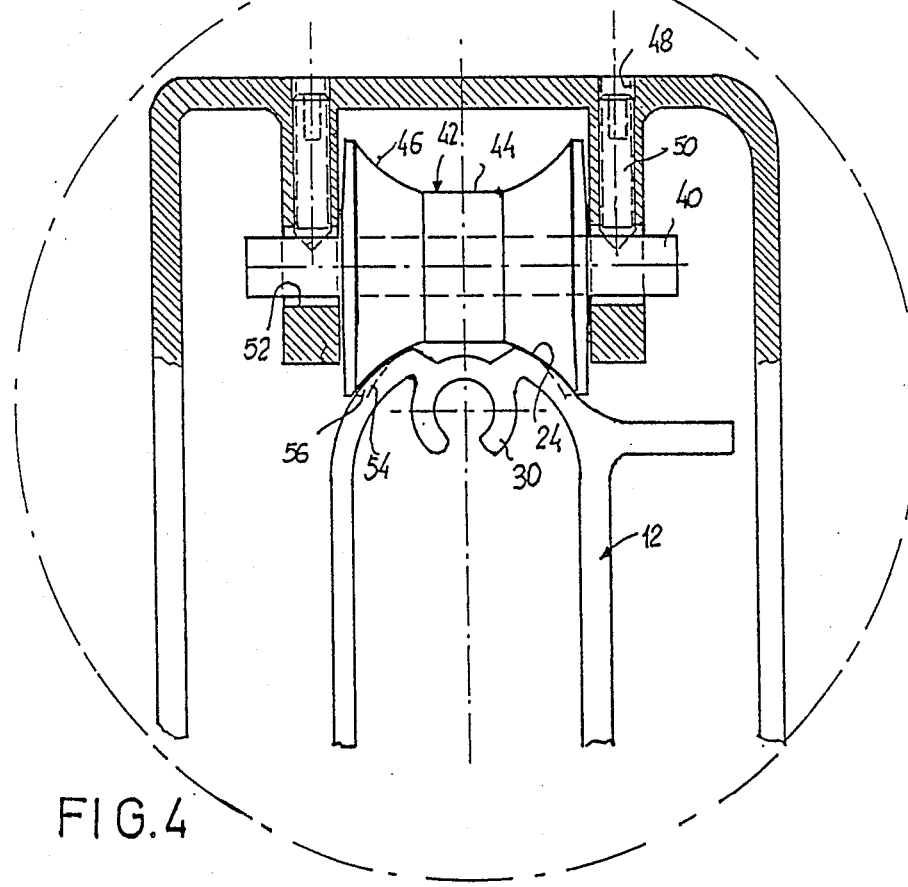

LIFTING PLATFORM GUIDING SYSTEM, PARTICULARLY FOR DYNAMICALLY LOADED PLATFORMS

The present invention relates to a lifting system for platforms, and more particularly to guided platforms on a post in which the platforms may have machinery secured thereto which, in operation, represents a dynamic load by transferring, for example, vibrations to the post, and especially to such a system in which the platform is guided for vertical movement on the post with minimum wear and tear even if a dynamic load is placed on the platform.

BACKGROUND

Various types of lifting platforms guidance systems are known and, frequently, are used as part of sewing machines or other machinery to permit raising and lowering of the machine along a vertical post. A platform is mounted on the post, for which, for example, the sewing machine is secured, the movement along the post permitting depression of the sewing machine for example into a well, so that the sewing machine table can be used for other purposes; or, when raised, to lift the sewing machine to different heights, in accordance with requirements for operation or convenience of the operator. Raising and lowering apparatus of this type may be single-post systems or portal-post systems.

To slide the platform along the post, it has been customary to utilize four ball bearings for each platform-and-post combination, the ball bearings being so located that, in operating condition, they are clamped with a bias force against guide or running surfaces on the post. The posts are usually made of bent or rolled sheet steel. Sewing machines and other machines in which components carry out reciprocating movement are subject to vibrations and oscillations which are transferred via the ball bearings to the post, and from the post to the furniture or furnishing which retains the post in position. Particularly when supporting sewing machines, the transfer of vibration to the support for the sewing machine is undesirable and leads to disturbances in sewing. The ball bearings and the guide surfaces are subject to substantial wear. The high engagement forces which are necessary to press the balls of the ball bearing on the guide surfaces in order to provide positive guidance without play results, in due course, in grooves and striations on the guide surfaces. The reaction forces are transferred over the axes of the ball bearings, and upon formation of grooves or deformation of the guide surfaces, the ball bearing retention elements have to be readjusted. Nevertheless, smooth operation of the carriage and vibration-free retention of the carriage is lost after some operating time.

THE INVENTION

It is an object to improve the lifting and guidance system for a platform, and more particularly for a platform retaining machinery apt to transfer vibration to a holding post, in which vibrations occurring on the platform are damped and prevented from being transferred to the post or, if so transferred, only to a greatly reduced extent and under damped condition, to insure quiet, essentially vibration-free running of the carriage on the post, even after substantial operating periods, so that the overall lifetime of the system is substantially extended.

Briefly, the post is formed as a shaped or profiled rail with four guide surfaces which, in cross section, define a guide line having a convex curvature. Preferably, the post is an extruded structure, and desirably of lightweight metal, such as an extruded aluminum rail. The platform is retained by bearing means engaging the post. The bearing means includes at least three rollers, operable about parallel axes transverse to the major axis of the post, made of wear-resistant, somewhat deformable plastic material. Each roller has a central portion which is spaced from the post, so that it is out of engagement therefrom, and two lateral portions which have a cross section which gradually increases towards the terminal ends of the respective roller such that, in axial cross section, the end portions have a conical curved shape. The rollers are rotatably secured on the carriage and positioned for engagement of the lateral portions thereof over essentially the entire guide line of the post.

In accordance with the present invention, thus, only three, or at most four rollers are needed rather than eight ball bearings. An upper and a lower roller are secured to the platform, positioned on one side of the post, and the opposite side has a third roller secured thereto located, for example, centrally between the upper and lower roller. It is, of course, also possible to use four rollers, namely an upper and a lower roller pair, in which case the rollers are preferably located in horizontal alignment opposite each other.

The particular shape of the rollers clamps the post in axial direction of the roller. This clamping force is transferred only to a minor extent on the shaft thereof. The major portion of the forces is accepted by the roller itself. This concept provides for wobble-free guidance of the platform with minimum reaction forces, so that transfer of vibration to the post is so damped as to become essentially negligible. The guide surfaces of the post, preferably linear aluminum guide surfaces formed on the aluminum extrusion thereof, in combination with plastic rollers insure reliable, quiet running, even after long operating time. The plastic rollers themselves provide for additional damping.

In accordance with a preferred and important feature of the invention, the cross-sectional contour of the running surfaces of the roller, that is, at the lateral portions thereof, is so matched to the guide surfaces of the post that the axially outermost regions of the rollers—before engagement with the post—extend within the vertically projected outline of the post. When this roller, then, is secured to the carriage and mounted on the post, localized elastic deformation of the contour of the lateral portions of the rollers will result, which will match themselves, by elastic deformation, to the guide surfaces of the post. The difference between the undeformed shape of the lateral portions of the rollers and the deformed shape—which corresponds to the guide surfaces of the post—preferably is approximately sickle-shaped; in other words, the cross-sectional contour of the running surfaces in engagement with the guide surfaces of the post forms, with the undeformed surface contour of a diametrically opposite running surface, when flipped by 180°, the aformentioned sickle-shaped portion. This arrangement results in deformation of only the axially outermost regions of the lateral portions of the roller. The deformation is elastic. This axial outermost running surface region, which will also coincide with the largest diameter of the roller, results, in assembly to the post, in outwardly directed axial pressure on the roller. Thus, the post will be elastically clamped between the outer portions of the roller, with a clamping force which acts essentially in axial direction of the roller. Reaction forces are absorbed in the roller itself and not transferred to the roller shaft.

DRAWINGS

FIG. 1 is a schematic front view of a single-post movable platform system in accordance with the invention;

FIG. 2 is a side view of the system of FIG. 1;

FIG. 3 is a top view of the post and carriage of the system, with a retention platform removed; and FIG. 4 is a fragmentary detail view within within the circle 4 of FIG. 3, to an enlarged scale.

DETAILED DESCRIPTION

The system 10, as best seen in FIGS. 1 and 2, has a post 12 on which a carriage 14 is guided for vertical up-and-down movement. The carriage has two bracket extensions 16, which form a lifting platform. The post 12 is retained at its upper end by an upper bracket 18, for example attached to a furniture element or sewing machine table frame. The lower end of the post 12 is secured to a bracket 20, for example likewise adapted for attachment to the furniture or sewing machine table frame. A control box 22 which includes a drive motor, control electronics, operating switches and the like, is likewise secured at the bottom brackets 20.

FIGS. 3 and 4 show the guidance system in detail. The post 12 is made of an aluminum extrusion shaped or profiled rail which is hollow and has an elongated cross section. Two opposite end portions form, each, two guide surfaces 24. In accordance with a feature of the invention, the guide surfaces 24 are located on a circle having a center 26 (FIG. 3). A recessed central portion 28 is located between the guide surfaces. The recessed central portion 28 has two inwardly bent rail sections 30 which, together with the portion 28, form a slit ring. The slit ring extends longitudinally over the entire length of the rail 12. The slit ring is tapped at the upper and lower end to provide a convenient attachment thread, for example for attachment to the brackets 18, 20 (FIGS. 1, 2). The guide surface 24 at the end portions of the rail are connected by longitudinal, flat connecting walls 32, to thus form a closed hollow shaped or profiled rail structure. Lateral projecting walls 34 extend from one of the connecting walls 32. The projecting walls 34 extend outwardly and have the same length. Together with the adjacent attachment wall 32, they define a chamber which is open to the outside to receive a drive element for the carriage, that is, to move it up and down, shown schematically as cable 60. Rather than cables, chains, geared belts or the like and other equivalent structures may be used.

The carriage 14 includes a housing 36, likewise made of aluminum extrusion, and defining a hollow profiled or shaped structure. It has internally extending projecting bearing walls 38, on which one or two shafts 40 are secured. FIG. 2 illustrates schematically and in chain-dotted lines an upper shaft 40 U and a lower shaft 40 L. A wide roller 42 is rotatably retained on the shaft 40. The axial width of roller 42 is approximately the same as the outer cross-sectional width of the post 12. Three or four rollers may be used positioned with their axes of rotation in parallel, and each made of highly wear-resistant plastic material.

In accordance with a feature of the invention, the rollers 42 are somewhat double-cone-shaped, with a relieved center portion. Thus, each roller 42 has a central portion or section 44 which is out of contact or out of engagement with the post 12, and two lateral portions or section 46 which are in engagement with the guide surfaces 24 of the post. The lateral portions 46, in axial cross section, have a contour which is at least approximately positioned on the same circle as that of the guide surfaces 24.

To provide for adjustment and clamping force, one pair of rollers, or a single roller positioned centrally between the upper and lower rollers on axes 40 U, 40 L, is adjustable towards the post 12. In FIG. 3, it is the leftward roller, also shown within the circle 4. For adjustment, the walls 38 are formed with tapped bores 48, intersecting the respective axis 40. Bolts 50 are screwed into the tapped bores 48. The shafts 40 are located in oval or elongated holes 52, and engagement of the respective bolts 50 with the shaft 40 permits tightening of the rollers against the post. By suitably tightening or screwing the bolts 50, the spacing of two rollers 42, with respect to oppositely placed rollers 42—relative to the cross section of the post—can be set in such a manner that the lateral portions 46 in the region close to or adjacent the central portion 44 engage the guide surfaces 24 on the post with a slight engagement pressure.

In accordance with a preferred feature of the invention, the axial cross-sectional shape of the lateral portions 46 is only approximately similar to the contour of the guide surfaces 24. The actual contour of the lateral portions 46, in cross section, is a concave curve which is shown in broken-line representation in FIG. 4 at 54. Curve 54 defines a continuous connection between two different circles which are concentric with respect to each other. The circle in the region close to the central portion 44 has the radius of the guide surfaces 24 of the post 12, and hence curve 54 terminates adjacent the central portion 44 at the guide surface 24—see FIG. 4. At the axially outwardly placed region of the lateral portion 46, the curve 54 terminates on a circle of smaller radius. The radius of the smaller circle is approximately 10% less than that of the concentrically positioned larger circle, that is, the circle defining the surfaces 24.

The rollers 42 are made of wear-resistant and sufficiently elastically deformable plastic material. Thus, the axially outermost regions of the lateral portions 46 are locally pressed outwardly in the region of engagement of the guide surfaces 24, thereby insuring a wide continuous surface engagement between the running surfaces 24 and the lateral portions 46. Due to the elastic deformation of the lateral portions 46, the engagement pressure of the rollers 42 on the post 12 increases with increasing distance from the axis 40. At the axially outermost ends it is a maximum. The result will be that the post 12 is so clamped by the two running surfaces of the lateral portions 46 that the main clamping forces are obtained by elastic deformation of the lateral regions of the roller. The primary component of the compression forces will be parallel to the axis 40. This portion of the reactive forces is accepted by and compensated by the roller 42.

The elastic deformation of the outer regions 46 of the running surfaces contributes essentially to quiet and vibration-free operation of the carriage 14 along the post 12. Vibrations which arise upon operation of a sewing machine located on the platform 16 are hardly transferred to the post 12. The elastic deformation is obtained due to the special shape of the surface 46. The relative shape of the guide surfaces 24 and the surfaces 46 are important. One may consider the undeformed engagement surface of the lateral portion 46 in a contacting plane rotated into the deformed contacting line. In such a theoretical consideration, the deformed contacting line forms with the undeformed contacting line, that is, the curve 54, a sickle-shaped portion, shown at 56 in FIG. 4. This sickle-shaped portion will be within the theoretical or projected region of the guide surface 24 of the post 12.

The cross-sectional contour of the guide surface 24, which, in operation, is matched by the cross-sectional contour of the lateral portions 46 of the roller 42, preferably are circular, as described, although this is not strictly necessary. The central portion 44 is free from engagement with the post. The arrangement described, providing for the sickle-shaped portion 46, insures that deformation of the running surface engagement increases as the distance from the horizontal center line—with reference to FIG. 3—of the post 12 increases.

The convex guide surfaces of the post 12 on the any one side are paired. The guide surfaces 24 have at least approximately a common center of curvature 26. The depressed portion 28 on the post insures that the central portion 44 of the rollers 42 will always be out of engagement therewith, while providing for simple manufacture. The slit ring cylinder formed by the portion 24 and the inwardly extending projections 30 of the post 12 provide for easy and simple mounting of the post on the respective brackets 18, 20, for subsequent attachment to furniture or other fittings.

The projecting legs 34, between which the drive element 60 is positioned, provide for protection of the drive element and separation of oil or contaminants therefrom.

The platform 40 preferably is an extruded or aluminum or other light-weight metal element, of essentially rectangular shape, preferably with rounded corners. The inwardly extending projections 38 carry one or two rollers, as desired. If three rollers are used, an upper and a lower roller are located, each, on one side of the post, and a third roller centrally between the two at the other side of the post. If four rollers are used, the upper and lower rollers are preferably directly opposite each other, although this is not necessary. In a three-roller arrangement, at least the single centrally positioned roller or, in a four-roller arrangement, preferably two rollers and, for accessibility, for example the outer ones are arranged to permit adjustment to and from the post by the bolts 50. Adjustment of the bolts 50 permits fine adjustment of the rollers which, being of somewhat elastic material, then will provide the desired engagement pressure against the post 12.

Various changes and modifications may be made within the scope of the inventive concept.

A suitable material for the rollers 42 is "Delrin" from Dupont or "Hostaform" from Hoeclest.

I claim:

1. Lifting platform guidance system, particularly for retention of machinery which, in operation, transfers vibration to the platform, having
   at least one upright post (12),
   said post comprising
   a shaft or profiled rail having four guide surfaces (24) which, in cross section, define a guide line having a convex curvature;
   a carriage (14) for supporting the platform, said carriage being movable up and down along the post; and
   rotating bearing means, coupling the carriage and the post while permitting said movement,
   said bearing means comprising
   at least three rollers (42) rotatable about parallel axes (40), said rollers comprising wear-resistant elastically deformable plastic material;
   each roller having a central portion (44) spaced from engagement with the post (12) and two lateral portions (46) which have, in cross section, gradually increasing dimension towards the terminal ends of the respective rollers and which, in axial cross section, have a concave curvature,
   wherein a projection of the shape of the lateral portions of the elastically deformable rollers, when undeformed, overlaps the guide line and, upon compression of said lateral portions against the post and elastic deformation of said lateral portions, provide for close matching of the concave curvature of the lateral portions of the roller to the shape of the convex curvature of the guide surfaces (24) of the post; and
   means (14, 36, 38) rotatably securing said rollers on the carriage (14) and positioning said rollers under compression against the upright post (12) and deformation of the lateral portions (46) and engagement of the lateral portions over essentially the entire guide line of the post (12).

2. The system of claim 1, wherein said post (12) comprises an extruded shaped or profiled rail.

3. The system of claim 1, wherein said post comprises an extruded rail of aluminum or similar light-weight metal.

4. The system of claim 1, wherein said lateral portions (46) in the region where the lateral portions overlap the guide line of the guide surfaces are sickle-shaped and define a major dimension adjacent the terminal ends of the rollers with a minimum dimension adjacent a region of the lateral portions of the rollers which is close to said central portion (44).

5. The system of claim 4, wherein, said convex curvature of the guide line of the guide surfaces (24) of the post and the concave curvature of the lateral portions (46) of the rollers are circular;
   the contour of said concave curvature of the lateral portions (46) of the rollers is defined by a curve (52) which intersects circles which, adjacent the central portion (44) of the roller, are on the same circle as the respective circle defining the convex curvature of the guide surfaces (24) and, in an axially outward region, are positioned on a circle concentric with the circle defining said convex curvature, and having a radius which is smaller than the radius of the circle defining said convex curvature.

6. The system of claim 1, wherein two guide surfaces (24) having said cross section defining the guide line of convex curvature are essentially circular and have at least approximately the same center.

7. The system of claim 1, wherein said post (12) comprises a hollow structure of elongated cross section having two pairs of guide surfaces (24), each formed with said convex curvature, and two essentially plane, flat connecting walls, joining respective guide surfaces of different pairs.

8. The system of claim 1, wherein said post comprises a hollow structure of elongated cross section, having two pairs of said guide surfaces located at respectively facing narrower end portions;

and a connecting portion (28) positioned between the respective guide surfaces of any pair, said guide surfaces being engaged by any one roller, said connecting portion being recessed with respect to facing ends of said guide surfaces to space said connecting portion from the central portion (44) of the contacting roller (42).

9. The system of claim 5, wherein said connecting portion includes a pair of inner projecting portions of essentially circular contour to define a slit ring cylinder extending longitudinally within said post.

10. The system of claim 5, wherein said post (12) comprises a hollow structure of elongated cross section having two pairs of guide surfaces (24), each formed with said convex curvature, and two essentially plane, flat connecting walls, joining respective guide surfaces of different pairs;

and two projecting wall portions (34) extending outwardly at essentially right angles with respect to said side wall to define an outwardly open chamber for reception of an endless drive element for the platform.

11. The system of claim 1, wherein said carriage (14) includes a frame element (36) formed as an extruded structure of at least approximately rectangular form, having two narrow sides; and the roller securing means includes
internally extending projecting wall portions (38), extending from the narrower sides at essentially right angles;
said rollers being rotatably retained in said inwardly extending wall portions.

12. The system of claim 1, wherein said means (38) rotatably securing said rollers on the carriage comprise adjustable means to permit adjustment of the respective position of at least one of the rollers with respect to said guide surfaces (24) on the post.

13. The system of claim 12, wherein said adjustable means comprises an externally accessible tapped bore (48) extending through a portion of the bearing in alignment with a shaft (40) of a roller to be adjusted;

an elongated bearing opening for the shaft of the roller formed in a portion of the housing, and extending transversely to said shaft;
and screw means (50) located in said tapped bore (48) and engageable with the shaft (40) of the respective roller to provide lateral pressure against the axis thereof, said bore being located in a plane extending transversely to the direction of said guide surfaces (24) on the post.

* * * * *

UNITED STATES PATENT AND TRADEMARK OFFICE
CERTIFICATE OF CORRECTION

PATENT NO. : 4,826,128
DATED : May 2, 1989
INVENTOR(S) : Michael SCHMELLER

It is certified that error appears in the above-identified patent and that said Letters Patent is hereby corrected as shown below:

Column 7, line 12 (claim 9), replace "of claim 5" by --of claim 8--.

Column 7, line 16 (claim 10), replace "of claim 5" by --of claim 9--.

Signed and Sealed this

Twenty-second Day of May, 1990

Attest:

HARRY F. MANBECK, JR.

*Attesting Officer*  *Commissioner of Patents and Trademarks*